BARTON PICKERING.
Fire-Kindler.
No. 127,365.  Patented May 28, 1872.
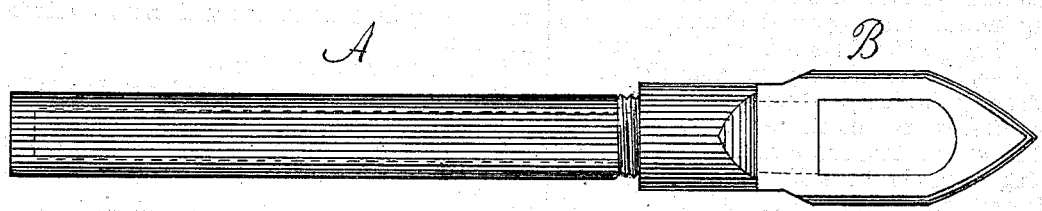

127,365

UNITED STATES PATENT OFFICE.

BARTON PICKERING, OF DAYTON, OHIO.

IMPROVEMENT IN FIRE-KINDLERS.

Specification forming part of Letters Patent No. 127,365, dated May 28, 1872.

Specification describing a certain Improvement for Kindling Fires, invented by BARTON PICKERING, of Dayton, in the county of Montgomery and State of Ohio.

The figure shows the fire-kindler in perspective.

A represents a hollow iron, which serves the purposes of a handle and fountain, and is closed at one end, and the other has a thread, to which the burner B is attached. The burner is cast of metal, the end next to the handle being round and the point flattened, with an orifice through it from side to side, and with a longitudinal opening for the handle and the wick. The point effects a fourfold purpose—that of heating the fluid, protecting the wick, penetrating the fuel, and for the suspension of the kindler when not in use, the special object being to protect the wick while the burner is being thrust into the fuel, thereby displacing it and preserving the flame. The burner is supplied with an ordinary wick, and the handle is filled with kerosene or other suitable fluid, and when the burner is screwed on and lighted it is ready for use. The burner may be adapted for a round wick, or other material than the ordinary wicking may be used. The quantity of fluid stored in the handle will serve to kindle many fires.

The burner may be varied in form from that shown and described—as, for instance, one side only may be cut away, thus forming on one side a cup-shaped vessel to catch the oil which may escape about the wick.

The essential features of the burner are the orifice for the wick and an open projecting point, for the purposes specified. The essential feature of the handle is that it be hollow, and it may be constructed with a reservoir in the end.

I claim as my invention—

1. The burner B, constructed substantially as described.

2. As a new article of manufacture, the fountain fire-kindler, composed of the parts A and B.

BARTON PICKERING.

Witnesses:
W. H. CLARK,
W. FOGLESONG.